(12) United States Patent
Holland et al.

(10) Patent No.: US 9,979,738 B2
(45) Date of Patent: May 22, 2018

(54) SYSTEM AND METHOD TO DETECT ATTACKS ON MOBILE WIRELESS NETWORKS BASED ON MOTIF ANALYSIS

(71) Applicant: HRL Laboratories, LLC, Malibu, CA (US)

(72) Inventors: Gavin D. Holland, Newbury Park, CA (US); Michael D. Howard, Westlake Village, CA (US); Chong Ding, Riverside, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 252 days.

(21) Appl. No.: 15/075,052

(22) Filed: Mar. 18, 2016

(65) Prior Publication Data

US 2017/0318033 A1    Nov. 2, 2017

Related U.S. Application Data

(63) Continuation-in-part of application No. 14/625,988, filed on Feb. 19, 2015, which is a continuation-in-part
(Continued)

(51) Int. Cl.
*G06F 19/00*        (2018.01)
*H04L 29/06*        (2006.01)
(Continued)

(52) U.S. Cl.
CPC ........ *H04L 63/1416* (2013.01); *H04L 63/145* (2013.01); *H04W 12/10* (2013.01); *H04W 84/18* (2013.01)

(58) Field of Classification Search
CPC ....... G06Q 10/06; G06C 99/00; B65G 59/066
(Continued)

(56) References Cited

U.S. PATENT DOCUMENTS 6,865,509 B1    3/2005   Hsiung et al.
9,367,694 B2 *  6/2016   Eck ..................... H04L 63/1433
(Continued)

FOREIGN PATENT DOCUMENTS

EP        2535000       12/2012
JP        2010-061450    3/2010
KR        10-0767589    10/2007

OTHER PUBLICATIONS

J. A. Almendral and A. Díaz-Guilera, Dynamical and spectral properties of complex networks, New J. Phys. 9 187, 2007.
(Continued)

*Primary Examiner* — Edward Raymond
(74) *Attorney, Agent, or Firm* — Tope-McKay & Associates

(57) ABSTRACT

Described is a system for detecting attacks on networks. A hierarchical representation of activity of a communication network is used to detect and predict sources of misinformation in the communication network. The hierarchical representation includes temporal patterns of communication between at least one pair of nodes, each temporal pattern representing a motif, having a size, in the hierarchical representation. Changes in motifs provide a signal for a misinformation attack.

23 Claims, 10 Drawing Sheets
(2 of 10 Drawing Sheet(s) Filed in Color)

Related U.S. Application Data of application No. 14/209,314, filed on Mar. 13, 2014, which is a continuation-in-part of application No. 13/904,945, filed on May 29, 2013, said application No. 13/904,945 is a continuation-in-part of application No. 13/748,223, filed on Jan. 23, 2013.

(60) Provisional application No. 61/941,893, filed on Feb. 19, 2014, provisional application No. 61/784,167, filed on Mar. 14, 2013, provisional application No. 61/589,634, filed on Jan. 23, 2012, provisional application No. 61/589,646, filed on Jan. 23, 2012, provisional application No. 61/694,510, filed on Aug. 29, 2012, provisional application No. 62/135,136, filed on Mar. 18, 2015, provisional application No. 62/135,142, filed on Mar. 18, 2015.

(51) Int. Cl.
*H04W 12/10* (2009.01)
*H04W 84/18* (2009.01)

(58) Field of Classification Search
USPC .................. 702/183, 182, 184, 185, 188
See application file for complete search history.

(56) References Cited

U.S. PATENT DOCUMENTS

| | | |
|---|---|---|
| 2006/0010493 A1 | 1/2006 | Piesco et al. |
| 2007/0019543 A1 | 1/2007 | Wei et al. |
| 2008/0301295 A1 | 12/2008 | Malkin et al. |
| 2009/0183260 A1 | 7/2009 | Hernacki et al. |
| 2010/0107254 A1 | 4/2010 | Eiland et al. |
| 2011/0066409 A1 | 3/2011 | Evans et al. |
| 2013/0091573 A1 | 4/2013 | Herz et al. |
| 2013/0139247 A1* | 5/2013 | Cianfrocca .............. H04L 63/02 726/14 |
| 2014/0053286 A1 | 2/2014 | Adams et al. |

OTHER PUBLICATIONS

Baneriee, L. E. Ghaoui, and A. D'Aspremont. Model Selection through Sparse Maximum Likelihood Estimation for Multivariate Gaussian or Binary Data. Journal of Machine Learning Research, 9:485-516, 2008.
Bolstad, B. D. V. Veen, and R. Nowak. Causal Network Inference via Group Sparse Regularization. IEEE Transaction on Signal Processing, 59(6): pp. 2628-2641, 2011.
G. L. Clark. Critical problems of geographical unemployment models. Progress in Human Geography, 1980.
V. Dakos, E. H. Nes, R. Donangelo, H. Fort, and M. Scheffer. Spatial correlation as leading indicator of catastrophic shifts. Theoretical Ecology, 3(3): pp. 163-174, Nov. 2009.
V. Dakos, M. Scheffer, E. H. van Nes, V. Brovkin, V. Petoukhov, and H. Held. Slowing Down as an Early Warning Signal for Abrupt Climate Change. Proceedings of the National Academy of Sciences of the United States of America, 105(38): pp. 14308-14312, Sep. 2008.
D. J. Fenn, M. A. Porter, S. Williams, M. Mcdonald, N. F. Johnson, and N. S. Jones. Temporal Evolution of Financial Market Correlations. arXiv, pp. 1-15, 2011.
D. K. Foot and W. J. Milne. Net migration estimation in an extended, multiregional gravity model. Journal of regional science, 24(1):119-33, Feb. 1984.
J. Friedman, T. Hastie, and R. Tibshirani. Sparse inverse covariance estimation with the graphical lasso. Biostatistics (Oxford, England), 9(3):432-41, Jul. 2008.
V. Guttal and C. Jayaprakash, Spatial variance and spatial skewness: leading indicators of regime shifts in spatial ecological systems, Theoretical Ecology, 2009.

R. M. May, S. A. Levin, and G. Sugihara. Ecology for Bankers. Nature, 451(February):893-895, 2008.
P. N. McGraw and M. Menzinger, Analysis of nonlinear synchronization dynamics of oscillator networks by Laplacian spectral methods, Physical Review E 75,2007.
P. E. McSharry, L. a. Smith, and L. Tarassenko. Prediction of epileptic seizures: are nonlinear methods relevant? Nature medicine, 9(3):241-2; author reply 242, Mar. 2003.
H. Moon and T.-C. Lu. Early warning signal of complex systems: Network spectrum and critical transitions. Workshop on Information in Networks, Apr. 2010.
Moran. Notes on Continuous Stochastic Phenomena. Biometrika, 37(1):17-23, 1950.
M. Scheffer, J. Bascompte, W. a. Brock, V. Brovkin, S. R. Carpenter, V. Dakos, H. Held, E. H. van Nes, M. Rietkerk, and G. Sugihara. Early-warning signals for critical transitions. Nature, 461(7260): pp. 53-59, Sep. 2009.
M. Scheffer and S. R. Carpenter. Catastrophic regime shifts in ecosystems: linking theory to observation. Trends in Ecology & Evolution, 18(12):648-656, Dec. 2003.
Stomakhin, M. B. Short, and L. Bertozzi. Reconstruction of Missing Data in Social Networks Based on Temporal Patterns of Interactions. 2011.
H. van Nes and M. Scheffer. Implications of Spatial Heterogeneity for Catastrophic Regime Shifts in Ecosystems. Ecology, 86(7):1797-1807, Jul. 2005.
L.M. Pecora and T.L. Carroll, Master Stability Functions for Synchronized Coupled Systems, Phys. Rev. Lett. 1998.
J. Yu, V. A. Smith, P. P. Wang, A. J. Hartemink, and E. D. Jarvis. Advances to Bayesian network inference for generating causal networks from observational biological data. Bioinformatics (Oxford, England), 20(18):3594-603, Dec. 2004.
N. L. Zhang and D. Poole. Exploiting Causal Independence in Bayesian Network Inference. Artificial Intelligence, 5:301-328,1996.
Ryan Compton, Hankyu Moon and Tsai-Ching Lu, \Catastrophe prediction via estimated network autocorrelation, WIN Workshop on Information in Networks, Sep. 2011.
Achlioptas, D.; D'Souza, R. M. & Spencer, J., Explosive Percolation in Random Networks, Science, 2009, 323, 1453-1455.
Buldyrev, S. V.; Parshani, R.; Paul, G.; Stanley, H. E. & Havlin, S., Catastrophic Cascade of Failures in Interdependent Networks, Nature, 2010, 464, 1025-1028.
da Costa, R. A.; Dorogovtsev, S. N.; Goltsev, A. V. & Mendes, J. F. F. Explosive Percolation Transition is Actually Continuous Phys. Rev. Lett., 2010, 105, 255701.
Crucitti, P.; Latora, V. & Marchiori, M., Model for Cascading Failures in Complex Networks, Phys. Rev. E, 2004, 69, 045104.
Erdös, P. & Rényi, A., On Random Graphs, I., Publicationes Mathematicae, 1959, 6, 290-297.
Kinney, R.; Crucitti, P.; Albert, R. & Latora, V., Modeling Cascading Failures in the North American Power Grid, Eur. Phy. J. B, 2005, 46, 101-107.
Moon, H. and Lu, T-C, Early Warning Signals of Complex Systems: Network Spectrum and Critical Transition, Workshop on Information in Networks, WIN 2010.
Riordan, O. & Warnke, L., Achlioptas Process Phase Transitions are Continuous, 2011, arXiv:1102.5306v2.
Scheffer, M.; Bascompte, J.; Brock, W. A.; Brovkin, V.; Carpenter, S. R.; Dakos, V.; Held, H.; van Nes, E. H.; Rietkerk, M. & Sugihara, G., Early Warning Signals for Critical Transitions, Nature, 2009, 461, 53-59.
Schreiber, T., Measuring Information Transfer, in Phys. Rev. Lett., 2000.
Lizier, J. T., The Local Information Dynamics of Distributed Computation in Complex Systens, Ph.D. thesis, University of Sidney, 20110.
D. Harmon, M De Aguitar, D. Chinellato, D. Braha, R.R. Epstein, and Y, Bar-Yam, Preceding economic market crises using measures of collective panic. Arxiv.org, 2011.
Office Action 1 for U.S. Appl. No. 13/748,223, dated Jan. 12, 2016.
Response to Office Action 1 for U.S. Appl. No. 13/748,223, dated Apr. 12, 2016.

(56) References Cited

OTHER PUBLICATIONS

Office Action 2 for U.S. Appl. No. 13/748,223, dated Jul. 14, 2016.
Response to Office Action 2 for U.S. Appl. No. 13/748,223, dated Nov. 14, 2016.
O. Kwon and J.-S. Yang, Information Flow between Stock Indices, (2008) EPL 82 68003.
H. Moon and T.-C. Lu, Early Warning Signal of Complex Systems: Network Spectrum and Critical Transitions, WIN (2010).
H. Moon and T.-C. Lu, Network Catastrophe: Self-Organized Patterns Reveal both the Instability and the Structure of Complex Networks, preprint, (2012).
M. Staniek and K. Lehnertz, Symbolic Transfer Entropy, Physical Review Letters 100, 15801, (2008).
M. Scheffer J. Bascompte, W.A. Brock, V. Brovkin, S.R. Carpenter, V. Dakos, H. Held, E.H. van Nes, M. Rietkerk, and G. Sugihara, Early-warning signals for critical transitions. Nature, 461, (2009).
T. Schreiber, Measuring Information Transfer, Phys. Rev, Lett. 85, 461, (2000).
PCT International Search Report and the Written Opinion of the International Searching Authority for PCT/US2014/026469, dated Jul. 25, 2014.
Lungarella, et al., "Information transfer at multiple scales," Physical Review E. No. 76, pp. 1-10, Nov. 27, 2007.
Lindner, et al., "TRENTOOL: A Mat lab open source toolbox to analyse information flow in time series data with transfer entropy," BMC Neuroscience, pp. 1-22, Nov. 18, 2011.
Runge, et al., "Quantifying causal coupling strength: A lag-specific measure for multivariate time series related to transfer entropy," Physical Review E pp. 1-15, Nov. 21, 2012.
Office Action 1 for U.S. Appl. No. 14/209,314, dated May 19, 2016.
Wang, Chaoili, "Analyzing information transfer in time-varying multivariate data". 2011 IEEE Pacific Visualization, Mar. 1, 2011 Symposium, pp. 99-106.
Weisstein, Eric W. "Least Squares Fitting—Logarithmic." From MathWorld—A Wolfram Web Resource. http://mathworld.wolfram.com/LeastSquaresFittingLogarithmic.html, Downloaded Apr. 25, 2017.
Wikipedia-Derivative, "https://web.archive.org/web/2011 0302203056/http/!en.wikipedia.org/wiki/Derivative", Wayback Machine Derivative Wikipedia, Mar. 2, 2011.
Wikipedia-Finite-Difference-Method, "https://web.archive.org/web/201 00331172231 /http://en.wikipedia.org/wiki/Finite_difference_method", Wayback Machine Finite Difference Method Wikipedia, Mar. 31, 2010.
Wikipedia-Least-Squares., "https://web.archive.org/web/2011 0304153506/http:/!en.wikipedia.org/wiki/Least_squares", Wayback Machine Least-Squares Wikipedia, Mar. 4, 2011.
Response to Office Action 1 for U.S. Appl. No. 14/209,314, dated Aug. 18, 2016.
Office Action 2 for U.S. Appl. No. 14/209,314, dated Sep. 8, 2016.
Response to Office Action 2 for U.S. Appl. No. 14/209,314, dated Dec. 8, 2016.
G. Holland and N. Vaidya, "Analysis of TCP performance over mobile ad hoc networks," in Proceedings of the 5th annual ACM/IEEE international conference on Mobile computing and networking, ser. MobiCom '99. New York, NY, USA: ACM, 1999, pp. 219-230.
Y.-Y. Liu, J.-J. Slotine, and A.-L. Barabási, "Controllability of complex networks," Nature, vol. 473, pp. 167-173, 2011.
Yang-Yu Liu, et al., "The observability of complex systems," PNAS, vol. 110, No. 7. pp. 2460-2465, 2013.
K.-Y. Ni and T,-C. Lu, "information dynamic spectrum predict critical transitions," in Proceedings of 2nd International Conference on Complex Sciences: Theory and Applications (COMPLEX 2012), Santa Fe, New Mexico, Dec. 2012, pp. 267-280.
A. Jøsang, "An algebra for assessing trust in certification chains," in Proceedings of the Network and Distributed Systems Security Symposium (NDSS'99). The Internet Society, 1999.
C. Nicolaides, L. Cueto-Felgueroso, M. C. González, and R. Juanes, "A metric of influential spreading during contagion dynamics through the air transportation network," PLOS one, vol. 7, No. 7, 2012, pp. e40961-1-040961-10.
J.-P. Hubaux, L. Buttyán, and S. Capkun, "The quest for security in mobile ad hoc networks," in Proceedings of the 2nd ACM international symposium on Mobile ad hoc networking & computing. ACM, 2001, pp. 146-155.
S. Marti, T. J. Giuli, K. Lai, M. Baker et al., "Mitigating routing misbehavior in mobile ad hoc networks," in International Conference on Mobile Computing and Networking: Proceedings of the 6 th annual international conference on Mobile computing and networking, vol. 6, No. 11, 2000, pp. 255-265.
H. Yang, J. Shu, X. Meng, and S. Lu, "Scan: self-organized network-layer security in mobile ad hoc network," Selected Areas in Communications, IEEE Journal on. vol. 24, No. 2, pp. 261-273, 2006.
Y. Zhang and W. Lee, "Security in mobile ad-hoc networks," in Ad Hoc Networks. Springer; 2005, pp. 249-268.
K. Govindan and P. Mohapatra, "Trust computations and trust dynamics in mobile adhoc networks: a survey," Communications Surveys & Tutorials, IEEE, vol. 14, No. 2, pp. 279-298, 2012.
A. Jøsang, R. Ismail, and C. Boyd, "A survey of trust and reputation systems for online service provision," Decision support systems, vol. 43, No. 2, pp. 618-644, 2007.
P. Michiardi and R. Molva, "Core: a collaborative reputation mechanism to enforce node cooperation in mobile ad hoc networks," in Proceedings of the IFIP TC6/TC11 Sixth Joint Working Conference on Communications and Multimedia Security: Advanced Communications and Multimedia Security, 2002, pp. 107-121.
S. Noel, M. Elder, S. Jajodia, P. Kalapa, S. O'Hare, and K. Prole, "Advances in topological vulnerability analysis," in Conference for Homeland Security, 2009. CATCH'09. Cybersecurity Applications & Technology. IEEE, 2009, pp. 124-129.
T. Karagiannis, K. Papagiannaki, and M. Faloutsos, "Blinc: multi-level traffic classification in the dark," in ACM SIGCOMM Computer Communication Review, vol. 35, No. 4. ACM, 2005, pp. 229-240.
S. Noel and S. Jajodia, "Understanding complex network attack graphs through clustered adjacency matrices," in Computer Security Applications Conference, 21st Annual. IEEE, 2005, pp. 1-10.
M. Kurant and P. Thiran, "Layered complex networks," Physical review letters, vol. 96, No. 13, pp. 138701-1-138701-4, 2006.
S. V. Buldyrev, R. Parshani, G. P. H. E. Stanley, and S. Havlin, "Catastrophic cascade of failures in interdependent networks," Nature, vol. 464, No. 7291, pp. 1025-1028, 2010.
Extendable Mobile Ad-hoc Network Emulator (EMANE), Naval Research Laboratory, Networks and Communications Systems Branch, pp. 1-3, downloaded Mar. 28, 2016, Available: http://cs.itd.nrl.navy.mil/-work/emane/.
J. Gao, S. V. Buldyrev, H. E. Stanley, and S. Havlin, "Networks formed from interdependent networks," Nature Physics, vol. 8, No. 1, pp. 40-48, 2011.
K. E. Defrawy and G. Tsudik, "Anonymous location aided routing in suspicious MANETs," IEEE Transactions on Mobile Computing (IEEE TMC), vol. 10, No. 9, pp. 1345-1358, Sep. 2011.
Y. Kong, "Resilience to degree-dependent and cascading node failures in random geometric networks," IEEE Transactions on Information Theory, vol. 56, No. 11, pp. 5533-5546, 2010.
Ns-3 discrete-event network simulator; downloaded Mar. 25, 2016, pp. 1-2, available: http://www.nsnam.org/.
N. C. Valler, B. A. Prakash, H. Tong, M. Faloutsos, and C. Faloutsos. "Epidemic spread in mobile ad hoc networks: determining the tipping point," in Proceedings of the 10th internationai IFIP TC 6 conference on Networking—vol. Part I, ser. NETWORK-iNG'11, Berlin, Heidelberg: Springer-Verlag, 2011, pp. 266-280.
Wernicke, Sebastian. "Efficient Detection of Network Motifs." IEEE/ACM Trans. Computational Biol. Bioinformatics 3, No. 4 (Oct. 2006): pp. 347-359, doi:1109/TCBB.2006,51.
Ribeiro, Pedro, and Fernando Silva. "G-Tries: An Efficient Data Structure for Discovering Network Motifs." In Proceedings of the

(56) References Cited

OTHER PUBLICATIONS

2010 ACM Symposium on Applied Computing, pp. 1559-1566 SAC '10. New York, NY, USA: ACM, 2010. doi:10.1145/1774088.1774422.
McKay, Brendan D. "Isomorph-Free Exhaustive Generation." Journal of Algorithms 26, No. 2 (Feb. 1998): pp. 306-234. doi:10.1006/jagm.1997.0898.
CERT US Secret Service and Deloitte. 2010 cybersecurity watch survey. CSO magazine, 2010.
David Allen, Tsai-Ching Lu, and David Huber. Detecting and analyzing relationships among anomalies. In IEEE VAST, 2009.
Vlichael McCormick. Data theft: a prototypical insider threat. In S. Stolfo et al. (Ed.), Insider Attack and Cyber Security, pp. 53-680. Springer, 2008.
2006 E-Crime Watch Survey CSO Magazine with U.S. Secret Service, CERT Coordination Center, and Microsoft Corp.
Brian Bowen, Malek Ben Salem, Shlomo Hershkop, Angelos Keromytis, Salvatore Stolfo. Designing Host and Network Sensors to Mitigate the Insider Threat. IEEE Security and Privacy, pp. 22-29, Nov./Dec. 2009.
Robert H. Anderson, Thomas Bozek, Tom Langstaff, Wayne Meitzler, Michael Skroch, and Ken Van Wyk. Research on mitigating the insider threat to information systems—#2, RAND Conference Proceedings, 2000.
D. Caputo, M. Maloof, and G. Stephens. Detecting the theft of trade secrets by insiders: a summary of MITRE insider threat research. IEEE Security & Privacy, Fall 2009.
Felicia Duran, Stephen H. Conrad, Gregory N. Conrad, David P. Duggan, and Edward Bruce Held. Building a system for insider security. IEEE Security and Privacy, pp. 30-38, Nov./Dec. 2009.
M. Keeney, E. Kowalski, D/ Cappelli, A. Moore, T. Shimeall, and S. Rogers. Insider threat study: computer system sabotage in critical infrastructure sectors. Joint SEI and U.S. Secret Service Report, 2005.
Adam Barth, Benjamin Rubinstein, Mukund Sundararajan, John Mitchell, Dawn Song, and Peter Bartlett. A learning-based approach to reactive security. In Proc. of the 14th International Conference on Financial Cryptography and Data Security, 2010.
Ya'akov Gal and Avi Pfeffer. Networks of influence diagrams: a formalism for reasoning about agents' decision-making processes. Journal of Artificial Intelligence Research 33, pp. 109-147, 2008.
Gérard Wagener, Radu State, Alexandre Dulaunoy, and Thomas Engel. Self adaptive high interaction honeypots driven by game theory. In SSS '09: Proceedings of the 11th International Symposium on Stabilization, Safety, and Security of Distributed Systems, pp. 741-755, Berlin, Heidelberg, 2009. Springer-Verlag.
Changhe Yuan, Xiaolu Liu, Tsai-Ching Lu, and Heejin Lim. Most relevant explanation: Properties, algorithms, and evaluations. In Proceeding of the 25th Conference on Uncertainty in Artificial Intelligence (UAI 2009), 2009.
Aaron Clauset, Cristopher Moore, and M. E. J. Newman. Hierarchical structure and the prediction of missing links in networks. Nature, 453 (7191): 98-101, 2008.
B. Davison and H. Hirsh. Predicting Sequences of User Actions. AAAI-98 Workshop, 1998.
Steven McKinney. Insider threat: user identification via process profiling. Ph.D. thesis, NCSU, 2008.
N. Nguyen, P. Reiher, and G.H. Kuenning. Detecting insider threats by monitoring system call activity. IEEE Information Assurance Workshop, United States Military Academy West Point, New York, 2003.
Malek Ben Salem, Shlomo Hershkop, and Salvatore Stolof, A Survey of Insider Attack Detection Research. In S. Stolfo et al. (Ed.), Insider Attack and Cyber Security, pp. 69-90. Springer, 2008.
Mikhail Belkin and Partha Niyogi. Laplacian Eigenmaps for dimensionality reduction and data representation. In Neural Computation, vol. 15, 2003.
N. Marwan, M.C. Romano, M. Thiel, and J. Kurths. Recurrence plots for the analysis of complex systems. In Physics Reports, 438, 237-329.

Malek Ben Salem and Salvatore Stolfo. Detecting Masqueraders: A Comparison of One-Class Bag-of-Words User Behavior Modeling Techniques. In Proceedings of the Second International Workshop on Managing Insider Security Threats, 2010.
M Schefler, J. Bascompte, W.A. Brock, V. Brovkin, S.R. Carpenter, V. Dakos, H. Held, E.H. van Nes, M. Rietkerk, and G. Sugihara. Early-warning signals for critical transitions. Nature, 461: 53-59, 2009.
O. Kwon and J.-S. Yang, Information Flow between Stock Indices, 2008 EPL 82 68003.
M. Staniek and K. Lehnertz, Symbolic Transfer Entropy, Physical Review Letters 100, 15801, 2008.
M. Scheffer, J. Bascompte, W.A. Brock, V. Brovkin, S.R. Carpenter, V. Dakos, H. Held, E.H. van Nes, M. Rietkerk, and G. Sugihara, Early-warning signals for critical transitions. Nature, 461, 2009.
T. Schreiber, Measuring Information Transfer, Phys. Rev, Lett. 85, 461, 2000.
K.-Y. Ni and T.-C. Lu, Detection and Identification of Directional Influences using Information Dynamic Spectrum, Proceedings of the 4th Workshop on Information in Networks, 2012.
D. Cappelli, R. Trzeciak, and R. Floodeen. "The Key to Successful Monitoring for Detection of Insider Attacks," presented at RSA Conference 2010, Mar. 2010.
2010 CyberSecurity Watch Survey, www.cert.org/archive/pdf/ecrimesummary10.pdf.
T. Kolda and B. Bader. "Tensor Decompositions and Applications," in SIAM Review, Jun. 2008.
J. Sun, D. Tao, S. Papadimitriou, P. Yu, and C. Faloutsos, "Incremental Tensor Analysis: Theory and Applications," in ACM Transactions on Knowledge Discovery from Data, vol. 2, No. 3, Oct. 2008.
National Research Council. "Network Science," The National Academies Press, 2005.
Charles Pfleeger. Reflections on the Insider Threat. In S. Stolfo et al. (Ed.), Insider Attack and Cyber Security, pp. 5-15. Springer, 2008.
Michael McCormick. Data theft: a prototypical insider threat. In S. Stolfo et al. (Ed.), Insider Attack and Cyber Security, pp. 53-68. Springer, 2008.
M. Scheffer, J. Bascompte, W.A. Brock, V. Brovkin, S.R. Carpenter, V. Dakos, H. Held, E.H. van Nes, M. Rietkerk & G. Sugihara, Early-warning signals for critical transitions. Nature, 461: 53-59, 2009.
V. Dakos, E. H. van Nes, R. Donangelo, H. Fort, and M. Scheffer (in press). Spatial correlation as leading indicator of catastrophic shifts. Theoretical Ecology, 2009.
P. N. McGraw and M. Menzinger, Analysis of nonlinear synchronization dynamics of oscillator networks by Laplacian spectral methods, Physical Review E 75, 2007.
D. Harmon, M De Aguitar, D. Chinellato, D. Braha, R.R. Epstein, and Y. Bar-Yam, Predicting economic market crises using measures of collective panic, Arxiv.org, 2011.
Hankyu Moon and Tsai-Ching Lu. Early warning signal of complex systems: Network spectrum and critical transitions. In Workshop on Information in Networks (WIN), 2010.
H. Moon and T.-C. Lu, Network Catastrophe: Self-Organized Patterns Reveal both the Instability and the Structure of Complex Networks, preprint, 2012.
Office Action 1 for U.S. Appl. No. 13/904,945, dated Oct. 7, 2016.
Wang, Chaoili, "Analyzing information transfer in time-varying multivariate data". 2011 IEEE Pacific Visualization, Mar. 1-4, 2011 Symposium, pp. 99-106.
Zennaro, Marino. "Stability of linear problems: joint special radius of sets of matrices"., Lecture 1, CIME-EMS Summer School in Applied Mathematics Jun. 27-Jul. 2, 2011—Cetraro (CS), Italy.
Response to Office Action 1 for U.S. Appl. No. 13/904,945, dated Jan. 9, 2017.
Notification of Transmittal of International Search Report and the Written Opinion of the International Searching Authority for PCT/US2016/023308, dated Dec. 23, 2016.
International Search Report of the International Searching Authority for PCT/US2016/023308; dated Dec. 23, 2016.
Written Opinion of the International Searching Authority for PCT/US2016/023308; dated Dec. 23, 2016.

(56) References Cited

OTHER PUBLICATIONS

Notification of Transmittal of International Search Report and the Written Opinion of the International Searching Authority for PCT/US2016/023307; dated Dec. 22, 2016.
International Search Report of the International Searching Authority for PCT/US2016/023307; dated Dec. 22, 2016.
Written Opinion of the International Searching Authority for PCT/US2016/023307; dated Dec. 22, 2016.
Y.-Y. Liu, J.-J. Slotine, and A.-L. Barabási "The observability of complex systems," PNAS, vol. 110, No. 7, pp. 2460-2465, 2013.
S. Marti, T. J. Giuli, K. Lai, M. Baker et al., "Mitigating routing misbehavior in mobile ad hoc networks," in International Conference on Mobile Computing and Networking: Proceedings of the 6th annual international conference on Mobile computing and networking, vol. 6, No. 11, 2000, pp. 255-265.
H. Yang, J. Shu, X. Meng, and S. Lu, "Scan: self-organized network-layer security in mobile ad hoc networks," IEEE Journal on Selected Areas in Communications, vol. 24, No. 2, pp. 261-273, 2006.
Y. Zhang and W. Lee, "Security in mobile ad-hoc networks," in Ad Hoc Networks. Springer, 2005, pp. 249-268.
K. Govindan and P. Mahapatra, "Trust computations and trust dynamics in mobile adhoc networks: a survey," Communications Surveys & Tutorials, IEEE, vol. 14, No. 2, pp. 279-298, 2012.
Borgatti, S and M. Everett, "A graph-theoretic perspective on centrality," Social Networks, 28(4), pp. 466-484, 2006.
Notification Concerning Transmittal of International Preliminary Report on Patentability for PCT/US2016/023307; dated Sep. 28, 2017.
International Preliminary Report on Patentability for PCT/US2016/023307; dated Sep. 28, 2017.
G. Holland and N. Vaidya, "Analysis of TCP performance over mobile ad hoc networks," in Proceedings of the 5th annual ACM/IEEE international conference on Mobile computing and networking, ser. MobiCom '99. New York, NY, USA: ACM, 1999, pp. 219-230. [Online]. http://doi.acm.org/10.1145/313451.313540.
Y.-Y. Liu, et al., "Controllability of complex networks," Nature, vol. 473, pp. 167-173, 2011.
Yang-Yu Liua, Jean-Jacques Slotinef, and Albert-László Barabásia, "The observability of complex systems," PNAS, vol. 110, No. 7, pp. 2460-2465, 2013.
K.-Y. Ni and T.-C. Lu, "Information dynamic spectrum predict critical transitions," in Proceedings of 2nd International Conference on Complex Sciences: Theory and Applications (COMPLEX 2012), Santa Fe, New Mexico, Dec. 2012, pp. 267-280.
A. Josang, "An algebra for assessing trust in certification chains," in J. Kochmar, editor, Proceedings of the network and Distributed Systems Security Symposium (NDSS'99), The Internet Society, 1999.
C. Nicolaides, L. Cueto-Felgueroso, M. C. González, and R. Juanes, "A metric of influential spreading during contagion dynamics through the air transportation network," PLOS one, vol. 7, No. 7, e40961, 2012.
H. Yang, J. Shu, X. Meng, and S. Lu, "Scan: self-organized network-layer security in mobile ad hoc networks," Selected Areas in Communications, IEEE Journal on, vol. 24, No. 2, pp. 261-273, 2006.
Y. Zhang, et al., "Security in mobile ad-hoc networks," in Ad Hoc Networks, Springer, 2005, pp. 249-268.
P. Michiardi, et al., "Core: a collaborative reputation mechanism to enforce node cooperation in mobile ad hoc networks," in Proceedings of the IFIP TC6/TC11 Sixth Joint Working Conference on Communications and Multimedia Security: Advanced Communications and Multimedia Security, 2002, pp. 107-121.
S. Noel, et al. "Advances in topological vulnerability analysis," in Conference for Homeland Security, 2009. CATCH'09. Cybersecurity Applications & Technology. IEEE, 2009, pp. 124-129.
M. Kurant, et al., "Layered complex networks," Physical review letters, vol. 96, No. 13, pp. 138701-1-138701-4, 2006.
Extendable Mobile Ad-hoc Network Emulator (EMANE). Naval Research Laboratory, Networks and Comm. Systems Branch. [Online] http://cs.itd.nrl.navy.mil/work/emane/, taken on Jan. 26, 2015.
J. Gao, et al., "Networks formed from interdependent networks," Nature Physics, vol. 8, No. 1, pp. 40-48, 2011.
K. E. Defrawy and G. Tsudik, "Anonymous location aided routing in suspicious MANETs," IEEE Transactions on Mobile Computing (IEEE TMC), vol. 10, No. 9,pp. 1345-1358, Sep. 2011.
NS-3 discrete-event network simulator. [Online] http://www.nsnam.org/ , taken Feb. 2015.
N. C. Valler, B. A. Prakash, H. Tong, M. Faloutsos, and C. Faloutsos, "Epidemic spread in mobile ad hoc networks: determining the tipping point," in Proceedings of the 10th international IFIP TC 6 conference on Networking—vol. Part I, ser. NETWORKING'11. Berlin, Heidelberg: Springer-Verlag, 2011, pp. 266-280. [Online] http://dl.acm.org/citation.cfm?id=2008780.2008807.

* cited by examiner

Enumeration of ESU (gtrieScanner)

*EnumerateSubgraphs(G,k)*
Input: A graph G = (V, E) and an integer 1 ≤ k ≤ |V|.
Output: All size-k subgraphs in G.
for each vertex v ∈ V do
  VExtension ← {u ∈ N({v}) | u > v}
  call ExtendSubgraph({v}, VExtension, v)
endfor

*ExtendSubgraph(VSubgraph, VExtension, v)*
if |VSubgraph| = k then output G[VSubgraph] and return
while VExtension ≠ ∅ do
  Remove an arbitrarily chosen vertex w from VExtension
  VExtension' ← VExtension ∪ {u ∈ $N_{excl}$(w, VSubgraph) | u > v}
  *ExtendSubgraph*(VSubgraph ∪ {w}, VExtension', v)
return

FIG. 6

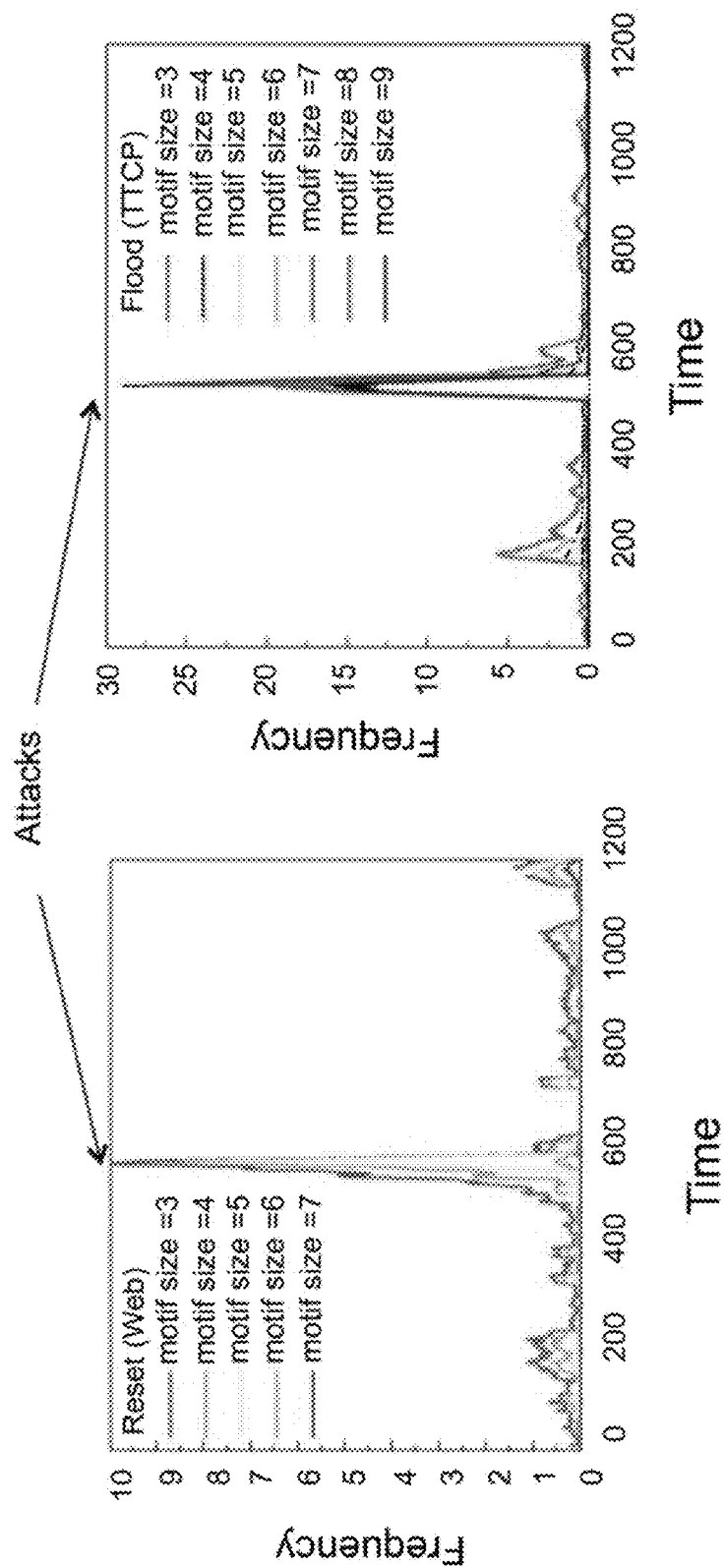

US 9,979,738 B2

SYSTEM AND METHOD TO DETECT ATTACKS ON MOBILE WIRELESS NETWORKS BASED ON MOTIF ANALYSIS

CROSS-REFERENCE TO RELATED APPLICATIONS

This is a Continuation-in-Part Application of U.S. application Ser. No. 14/625,988, filed on Feb. 19, 2015, entitled, "System and Method for Determining Reliability of Nodes in Mobile Wireless Network," which is a Non-Provisional patent application of U.S. Provisional Application No. 61/941,893, filed on Feb. 19, 2014, entitled, "System and Method to Quantify Reliability of Nodes in Mobile Wireless Networks," the entirety of which are incorporated by reference. U.S. application Ser. No. 14/625,988 is also a Continuation-in-Part Application of U.S. application Ser. No. 14/209,314, filed on Mar. 13, 2014, entitled, "Predicting System Trajectories Toward Critical Transitions," which is a Continuation-in-Part Application of U.S. application Ser. No. 13/904,945, filed on May 29, 2013, entitled, "Detection and Identification of Directional Influences Using Dynamic Spectrum," the entirety of which are incorporated herein by reference. U.S. application Ser. No. 14/209,314 is a Non-Provisional patent application of U.S. Provisional Application No. 61/784,167, filed on Mar. 14, 2013, entitled, "Predicting System Trajectories Toward Critical Transitions," the entirety of which are incorporated herein by reference. U.S. application Ser. No. 13/904,945 is a Continuation-in-Part Application of U.S. application Ser. No. 13/748,223, filed on Jan. 23, 2013, entitled, "Early Warning Signals of Complex Systems," which is a Non-Provisional patent application of U.S. Provisional Application No. 61/589,634, filed on Jan. 23, 2012, entitled, "Early Warning Signals of Complex Systems," and U.S. Provisional Application No. 61/589,646, filed on Jan. 23 2012, entitled, "System and Method for Cyber Infrastructure Protection from Insider Threats," the entirety of which are incorporated herein by reference. U.S. application Ser. No. 13/904,945 is also a Non-Provisional patent application of U.S. Provisional Application No. 61/694,510, filed on Aug. 29, 2012, entitled, "Detection and Identification of Directional Influences Using Dynamic Spectrum," the entirety of which are incorporated herein by reference.

This is a Non-Provisional patent application of U.S. Provisional Patent Application No. 62/135,136 filed Mar. 18, 2015, entitled, "System and Method to Detect Attacks on Mobile Wireless Networks Based on Motif Analysis," the entirety of which is incorporated herein by reference.

This is ALSO a Non-Provisional patent application of U.S. Provisional Patent Application No. 62/135,142 filed Mar. 18, 2015, entitled, "System and Method to Detect Attacks on Mobile Wireless Networks Based on Network Controllability Analysis," the entirety of which is incorporated herein by reference.

This invention was made with government support under U.S. Government Contract Number AFRL FA8750-14-C-0017. The government has certain rights in the invention.

BACKGROUND OF INVENTION

(1) Field of Invention

The present invention relates to a system for detecting sources of misinformation in mobile wireless networks and, more particularly, to a system for detecting sources of misinformation in mobile wireless networks based on motif analysis.

(2) Description of Related Art

Due to the dynamic nature of mobile wireless networks, the network applications, protocols, and services from which they are built employ implicit trust and sharing of control information. This makes the detection of misinformation particularly difficult. Although current network protocol stacks secure the wireless transmissions between pairs of nodes from outside observers, their reliance on shared information to enable the collection of nodes to operate as a network makes it very difficult to defend from an "insider" node that issues misinformation.

Existing security solutions (such as those described in Literature Reference Nos. 1-4 in the List of Incorporated Literature References) for mobile wireless networks typically characterize the network by monitoring performance metrics, such as throughput, latency, and jitter at separate layers within the networking stack, looking for anomalies in behavior from a baseline that, at this level of abstraction, is very noisy and very difficult to accurately characterize for a broad range of conditions. Even under ideal circumstances, significant disruptions in the overall network utility can be caused by small amounts of misinformation that target only a few critical network elements (i.e., a "shrew" attack) that are below the threshold of detection using such performance metrics based anomaly detection.

Other existing security solutions (such as those described in Literature Reference Nos. 1-4 and 5) are capable of detecting small changes in misinformation, such as those in "shrew" attacks, but they require detailed knowledge of the network configuration, such as the type and state of protocol instances, applications, and the underlying physical wireless channel. Such protocol-specific, or specification-based, approaches are difficult to implement and maintain, and are only practical for network elements that have simple and easily observable state machines (e.g., media access control (MAC) protocols or routing protocols). However, these approaches fail if the specification and implementation of the element deviate in a manner that can be exploited with misinformation, or if the specification itself has flaws that can be exploited. The published literature (such as Literature Reference Nos. 1 and 4) have shown that both of these flaws(i.e., implementation flaws and specification flaws) are common.

Thus, a continuing need exists for a system that enables protocol agnostic detection of misinformation at the control plane, including targeted misinformation.

SUMMARY OF THE INVENTION

The present invention relates to a system for detecting sources of misinformation in mobile wireless networks and, more particularly, to a system for detecting sources of misinformation in mobile wireless networks based on motif analysis. The system comprises one or more processors and a memory having instructions such that when the instructions are executed, the one or more processors perform multiple operations. A hierarchical representation of activity of a communication network is used to detect and predict sources of misinformation in the communication network. The hierarchical representation comprises a plurality of nodes and temporal patterns of communication between at least one pair of nodes, each temporal pattern representing a motif, having a size, in the hierarchical representation. Changes in motifs provide a signal for a misinformation attack.

In another aspect, a visual representation on a display relating to motifs of interest is generated to identify a misinformation attack.

In another aspect, a misinformation attack is characterized by an over-representation of motifs having a predetermined size.

In another aspect, a size threshold for detection of a misinformation attack is set by learning a maximum frequency of motifs of each size in a normal baseline operation of the communication network.

In another aspect, if a frequency of any motif size surpasses double the maximum frequency, a misinformation attack signal is detected.

In another aspect, the system introduces a motif attribution measure at each node i of the communication network. For each node i, $m_i$ is defined as a frequency of sub-graphs to which it contributes. A $m_i$ greater than double the maximum frequency indicates a likelihood that node i is an attacker.

In another aspect, the hierarchical representation comprises a plurality of data tables that describe applications and services running on the communication network and a set of inter-dependencies between the applications and services.

In another aspect, upon detection of an attack of misinformation on the communication network, the system performs a mitigation action.

In another aspect, the mitigation action comprises isolating an attacking node from the rest of the communication network.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 6 is a table illustrating pseudo-code of the Enumerate Subgraph (ESU) algorithm for finding sub-graphs according to various embodiments of the present disclosure;

FIG. 7A is a plot illustrating motif size frequency during reset attacks according to various embodiments of the present disclosure;

FIG. 7B is a plot illustrating motif size frequency during flood attacks according to various embodiments of the present disclosure;

DETAILED DESCRIPTION

Figure 1:
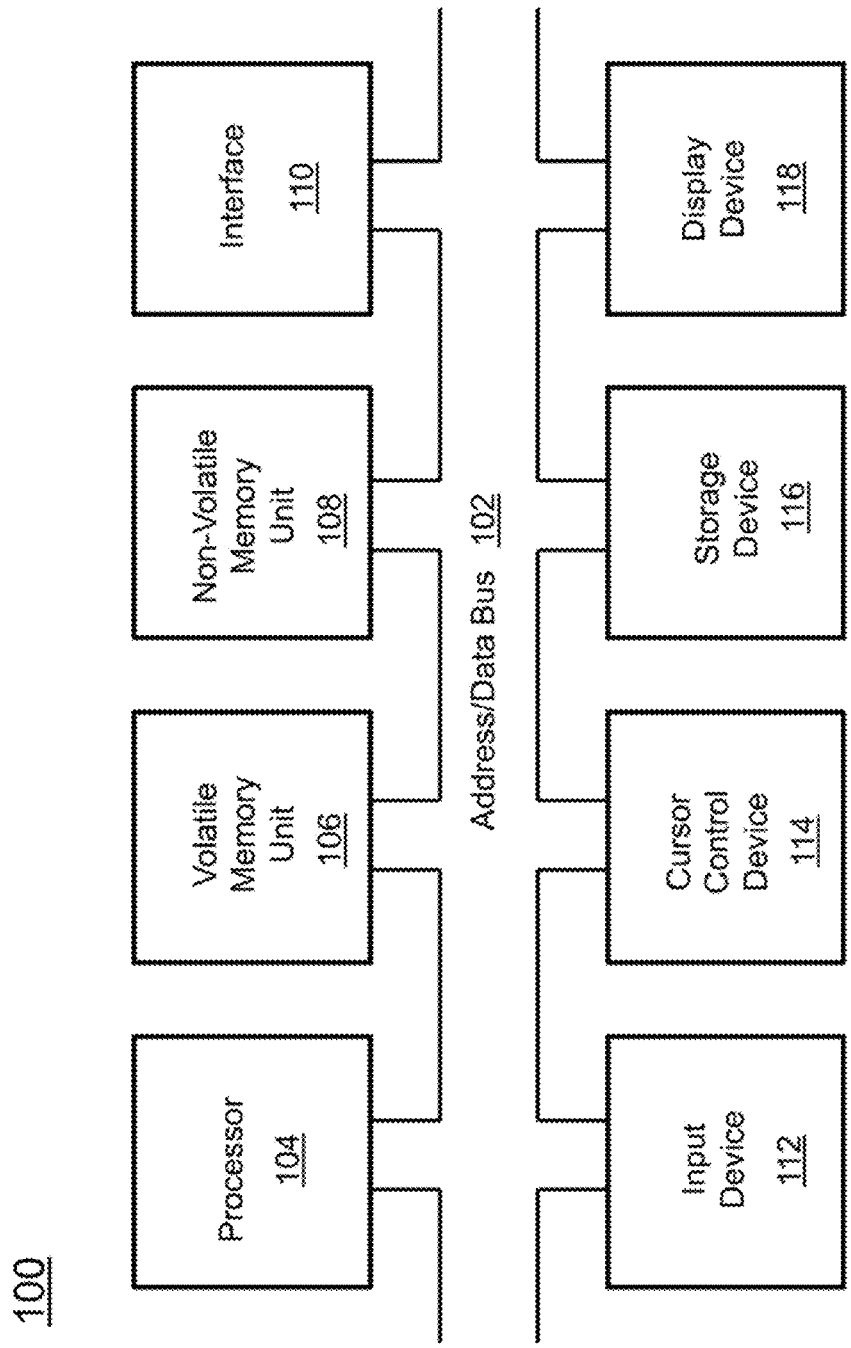
FIG. 1 is a block diagram depicting the components of a system for detecting sources of misinformation in mobile wireless networks according to various embodiments of the present disclosure.

The present invention relates to a system for detecting sources of misinformation in mobile wireless networks and, more particularly, to a system for detecting sources of misinformation in mobile wireless networks based on motif analysis. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references as used in the description is provided. Next, a description of various principal aspects of the present invention is provided. Finally, specific details of the present invention are provided to give an understanding of the specific aspects.

(1) LIST OF INCORPORATED LITERATURE REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. J.-P. Hubaux, L. Buttyán, and S. Capkun, "The quest for security in mobile ad hoc networks," in Proceedings of the 2nd ACM international symposium on Mobile ad hoc networking & computing. ACM, 2001, pp. 146-155.
2. S. Marti, T. J. Giuli, K. Lai, M. Baker et al., "Mitigating routing misbehavior in mobile ad hoc networks," in International Conference on Mobile Computing and Networking: Proceedings of the 6th annual international conference on Mobile computing and networking, vol. 6, no. 11, 2000, pp. 255-265.
3. H. Yang, J. Shu, X. Meng, and S. Lu, "Scan: self-organized network-layer security in mobile ad hoc networks," Selected Areas in Communications, IEEE Journal on, vol. 24, no. 2, pp. 261-273, 2006.
4. Y. Zhang and W. Lee, "Security in mobile ad-hoc networks," in Ad Hoc Networks. Springer, 2005, pp. 249-268.
5. K. E. Defrawy and G. Tsudik, "Anonymous location aided routing in suspicious MANETs," IEEE Transactions on Mobile Computing (IEEE TMC), vol. 10, no. 9, September 2011.
6. Wernicke, Sebastian. "Efficient Detection of Network Motifs." IEEE/ACM Trans. Computational Biol. Bioinformatics 3, no. 4 (October 2006): 347-59. doi:10.1109/TCBB.2006.51.
7. Ribeiro, Pedro, and Fernando Silva. "G-Tries: An Efficient Data Structure for Discovering Network Motifs." In Proceedings of the 2010 ACM Symposium on Applied Computing, 1559-66. SAC '10. New York, N.Y., USA: ACM, 2010. doi:10.1145/1774088.1774422.
8. McKay, Brendan D. "Isomorph-Free Exhaustive Generation." Journal of Algorithms 26, no. 2 (February 1998): 306-24. doi:10.1006/jagm.1997.0898.

(2) Principal Aspects

The present invention has three "principal" aspects. The first is a system for detecting sources of misinformation in mobile wireless networks. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. For example, the input device 112 may include one or more sensors, such as a camera for video or still images, a microphone, or a neural sensor. Other example input devices 112 may include an accelerometer, a GPS sensor, or a gyroscope.

In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
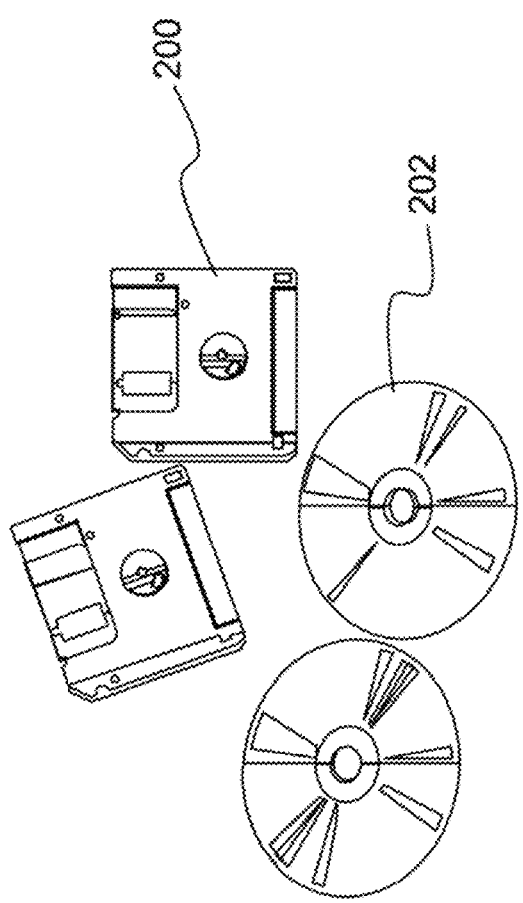
FIG. 2 is an illustration of a computer program product according to various embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

The eXploitation network (Xnet) is a hierarchical model of a network (a network of networks) that provides three different views of the network, linked together by directional links. Xnet is described in detail in U.S. patent application Ser. No. 14/625,988, which is hereby incorporated by reference as though fully set forth herein. The model includes an application dependency layer and a network dependency layer in addition to the network topology itself. Xnet moves the problem out of the realm of conventional wireless networking techniques, which are focused on throughput between pairs of nodes, into a representation that enables a more holistic behavioral treatment. This transfer to the representation is the foundation that enables the social networking and information dynamics approach of the present invention. The system according to embodiments of the invention relies on the Xnet hierarchical model of network activity.

Figure 10:
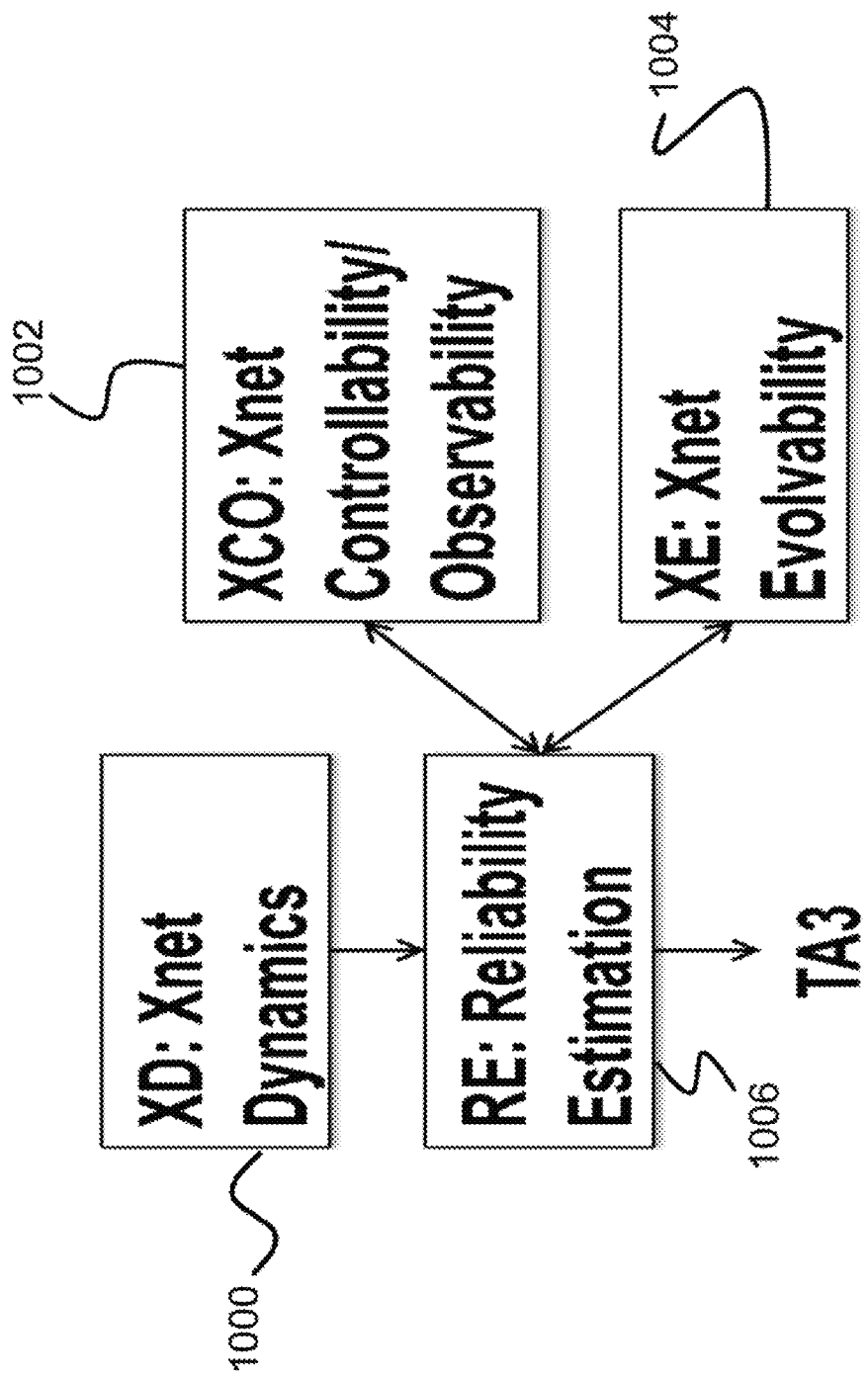
FIG. 10 is an illustration depicting a relationship between modules of the Xnet model according to some embodiments of the present disclosure.

As depicted in FIG. 10, the Xnet model includes at least four unique modules, including the Xnet Dynamics (XD) module 1000, the Xnet Controllability/Observability (XCO) module 1002, the Xnet Evolvability (XE) module 1004, and (4) the Reliability Estimation (RE) module 1006. The XD module 1000 identifies unreliable nodes based on the dynamics of social networks (with no dependency on protocol) to indicate the presence of malicious or damaged nodes altering control and data plane information in the network. The XCO module 1002 identifies the optimal set of nodes required to passively monitor (observability) or actively probe (controllability) a suspected source of misinformation. These techniques require significantly fewer nodes (i.e., lower overhead than the prior art) to form a consensus on whether a suspected source of misinformation is malicious without compromising accuracy (increased probability of detection, lowered probability of false alarms). The XE module 1004 simulates a progression of failures to predict which nodes are most likely to be attacked next or should have trust reassessed. Finally, the RE module 1006 fuses cross-layer and cross-plane (control and data plane) information to identify suspicious nodes and improve reputation-based trust management. The unified trust metric is computed in a hybrid approach in which nodes combine normalized confidence and trust values based on direct experience and recommendations of other nodes. Such a hybrid approach avoids a centralized point of failure, ensures scalability, and renders the computation resilient to attacks targeting such computations. These modules are described in further detail below.

All modules communicate by annotations on Xnet. The XD module 1000 identifies nodes that appear to be misbehaving. The RE module 1006 gets a minimal set of driver and observer nodes from the XCO module 1002 for the suspect nodes. The RE module 1006 uses the driver nodes to do active probing on the suspect nodes, and the observer nodes update a trust metric with the results. The XE module 1004 simulates a spread of compromised nodes The RE module 1006 formalizes and quantifies trust using a model that relies on local computations based on direct interactions with neighbors and also by incorporating recommendations (and experiences) of other nodes. A formal subjective logic and trust model is leveraged for principled combination of evidence about how trustworthy a node is. Resilience to attacks is gained by adopting a hybrid distributed approach to compute trust, avoiding a single point of failure, and the approach is agnostic to control and/or data plane statistics being used. When the RE module's 1006 trust in a node falls below a certain level, it performs active probing on the node. To do that most efficiently the XCO module 1002 computes a minimal set of driver nodes to issue the challenges and observer nodes to observe the results.

The system also employs a two-pronged approach to discover sources of misinformation in the network, employing information dynamics identification of suspicious changes in Xnet dependencies, as well as trends in the appearance of such compromised nodes. First the XD module 1000 uses a unique information dynamic spectrum framework to predict system instability at critical transitions in complex systems, by analyzing Xnet time series data. This marks nodes for further inspection by the RE module 1006. Second, the XE module 1004 tracks trends in misbehaving nodes, and matches against simulations of contagion and cascading failures. The XE module 1004 will emit a confidence measure as to whether there is a pattern, and if so, the RE module 1006 can focus monitoring and testing resources on predicted next nodes to be attacked. System Administrators can use this information to focus preventative measures.

(3.1) Concept of Operation

Below is a description of operation of the Xnet tool described in U.S. patent application Ser. No. 14/625,988, with a non-limiting example of a notional mission that progresses in distinct stages front initialization to deployment, fielded operation, and cyber attack. In particular, cyber attacks on the "control plane" of the network, which are the software systems and protocols that are responsible for managing how information in the "data plane" is communicated across the network. For example, one software system that is critical to the operation of a mobile wireless network is the routing daemon, which is responsible for maintaining the routing tables that each node in the physical network uses to determine how to relay data from one node to another.

In some embodiments, during an initialization stage, network administrators configure each node of a network (e.g., mobile wireless network) with compatible networking stacks, host and network services, applications, and other software necessary for the mission, including suite of modules with supporting configuration data. Then, the hierarchical representation of the network (i.e., Xnet), is created in the form of data tables that describe the applications and services that are running on the network, their inter-dependencies, and observable characteristics of their behavioral dynamics under normal operation (e.g., node degree, traffic flow characteristics, topology). The Xnet Motifs (XM) module receives the Application Dependency (AppDep) and Network Dependency (NetDep) graph from Xnet. For further details regarding Xnet, refer to U.S. patent application Ser. No. 14/625,988, which is hereby incorporated by reference in its entirety.

In a nominal (fielded) stage, the XM module monitors the dynamics of the AppDep and NetDep graphs by collecting time-series data on statistics identified in its baseline configuration. It will develop baseline frequencies for each size of motif that occurs during a set quantum of time (e.g., time quantum of 10 seconds). This will include keeping track of typical temporal sequences of motifs.

In a detection phase of an attack stage, a compromised node will attract the attention of the XM module, which will observe a sudden change in the frequency of motif sizes. For example, malicious dropping of packets at a node will result in a step-change in the load between applications and services that depend on that node. For example, the attacking node's dropping of packets can be observed directly at the media access control (MAC) layer by monitoring the channel and observing whether the node is forwarding packets to the next hop.

In an attribution phase of an attack stage, by comparing the patterns of detections at different points within the abstract and real network, the compromised nodes may be revealed. For example, nodes that are common in motifs labeled as anomalous and/or that share an edge that has been detected as having anomalous dynamics are classified as suspects. The abstract network (or graph) refers to the abstract mathematical representation of the relationship between communicating entities in a physical network (i.e., a real network comprising physical nodes (e.g., radios)).

(3.2) Network Motifs

As described above, the Xnet is a hierarchical network of network graphs whose nodes include the physical radios communicating on the network as well as conceptual nodes that represent communicating network entities, such as applications and network services. Edges between nodes are created whenever one of these nodes sends data to another node (just the start and end node, not the intermediate nodes that forward the message datagrams). An edge exists until the message reaches its destination. Network motifs are temporal patterns of communication between nodes. Network activity is divided into windows of time. During each window, if an edge appears between two nodes, it can be counted in motifs for that window. Network motifs are recurrent and statistically significant sub-graphs or patterns of communication between the subsets of nodes that work together. Each of these sub-graphs, defined by a particular pattern of interactions between vertices, may reflect a framework in which particular communication protocols are achieved efficiently. Indeed, motifs are of notable importance largely because they capture the underlying communication structure of a wireless network. Changes in the histogram of motif sizes provide a characteristic signal for certain types of attacks. When attacks happen, different recurrent sub-graphs would reflect changes in the network communication pattern and, consequently, result in the detection.

(3.2.1) Problem Definition

Let $G=(V, E)$ and $G'=(E', V')$ be two graphs. V denotes vertices (also referred to as "nodes" when discussed in the context of the abstract network). E denotes edges (also referred to as "links"). Graph G' is a sub-graph of graph G (written as $G' \subseteq G$) if $V' \subseteq V$ and $E' \subseteq E \cap (V' \times V')$. If $G' \subseteq G$ and G' contains all of the edges $<u, v> \in E$ with $u, v \in V'$, then G' is an induced sub-graph of G. Call G' and G isomorphic (written as $G' \leftrightarrow G$), if there exists a bijection (one-to-one) $f: V' \rightarrow V$ with $<u, v> \in E' \Leftrightarrow <f(u), f(v)> \in E$ for all $u, v \in V'$. The mapping f is called an isomorphism between G and G'. When $G'' \subset G$ and there exist an isomorphism between the sub-graph G'' and a graph G', this mapping represents an appearance of G' in G. The number of appearances of graph G' in G is called the frequency $F_G$ of G' in G.

Figure 3:
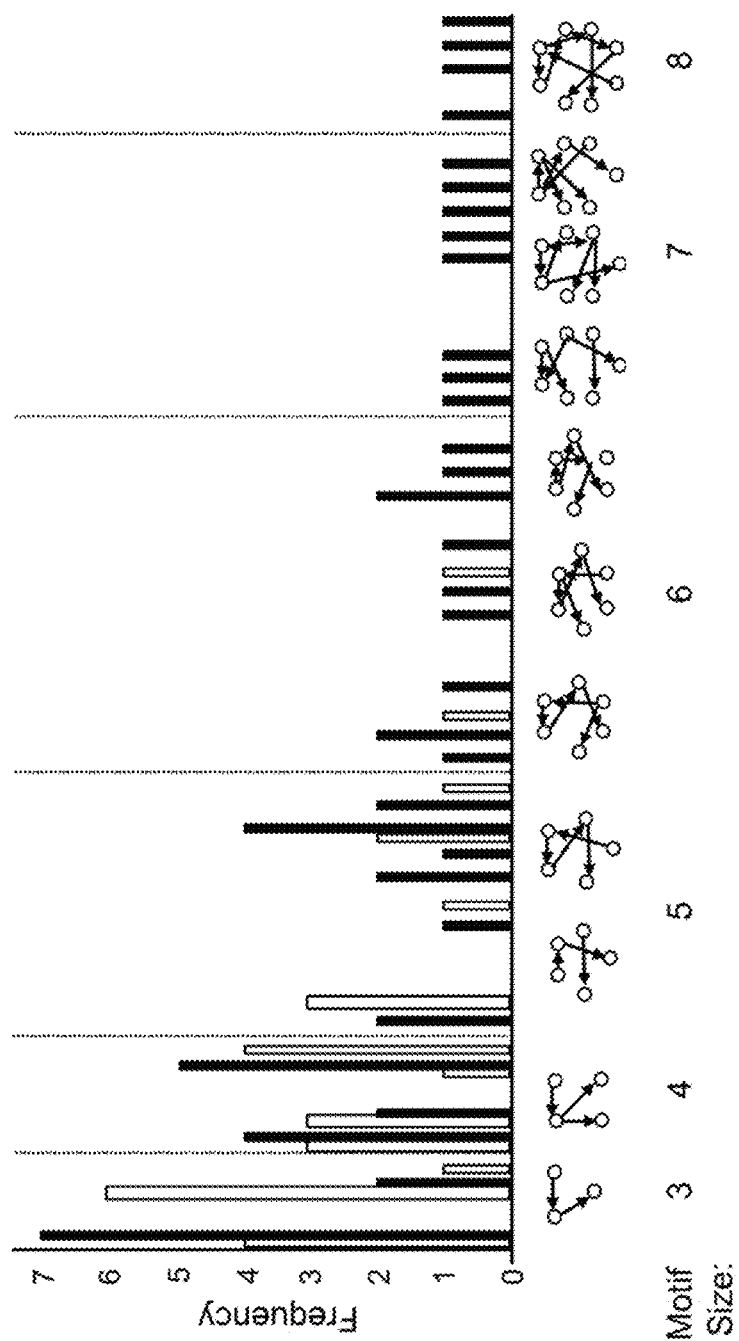
FIG. 3 is an illustration of network motif size frequencies according to various embodiments of the present disclosure.
Figure 4:
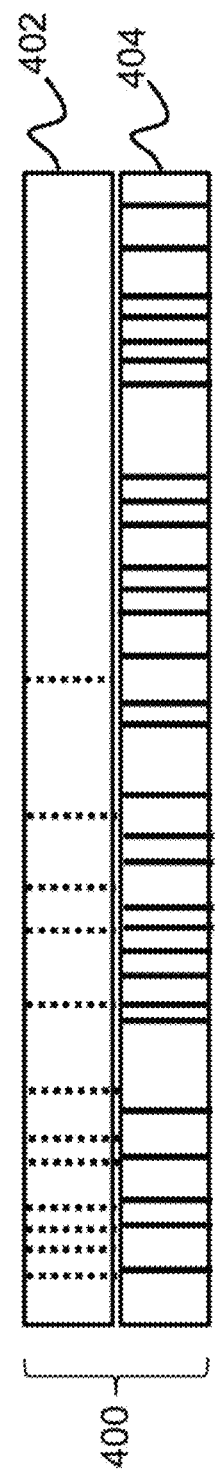
FIG. 4 is an illustration of a barcode of sub-graphs for regular and attacking patterns in FIG. 3 according to various embodiments of the present disclosure.

FIG. 3 is a graph illustrating network motif size frequencies during attack vs. normative, demonstrating FG(G') for both regular and attack patterns. Regular patterns are represented by unfilled bars, while attack patterns are represented by filled bars. FIG. 3 indicates that it is unlikely to find large motifs (size>5) in a regular communication network (as indicated by the absence of regular patterns) compared to the one under flooding attacks (as indicated by the presence of attack patterns), suggesting a potential attack detector. To be precise, barcodes of notable motifs for different communications were defined that allow one to identify attacks. FIG. 4 is an illustration of a barcode 400 of sub-graphs for regular and attacking patterns in FIG. 3, where the top sub-graph 402 represents regular patterns, and the bottoms sub-graph 404 represents attack patterns.

Motifs are those sub-graphs with the frequency FG(G') greater than a predefined threshold or cut-off value. Traditionally, the threshold is determined by comparing to a null model, such as the recurrent frequency of the same sub-graph in a randomized graph. However, this definition is not appropriate for mobile networking problems. Indeed, one goal here is to distinguish frequent sub-graphs in regular and attack patterns. Yet, even in the communication network running under normal conditions, FG(G') may be very different from a completely random graph model. Therefore, the approach according to embodiments of the present invention takes FG(G') of the regular pattern as the null model. An abnormal pattern will be detected if its FG(G') significantly deviates from the null model defined above.

(3.2.2) Motif Discovery Algorithms

Figures 5A, 5B:
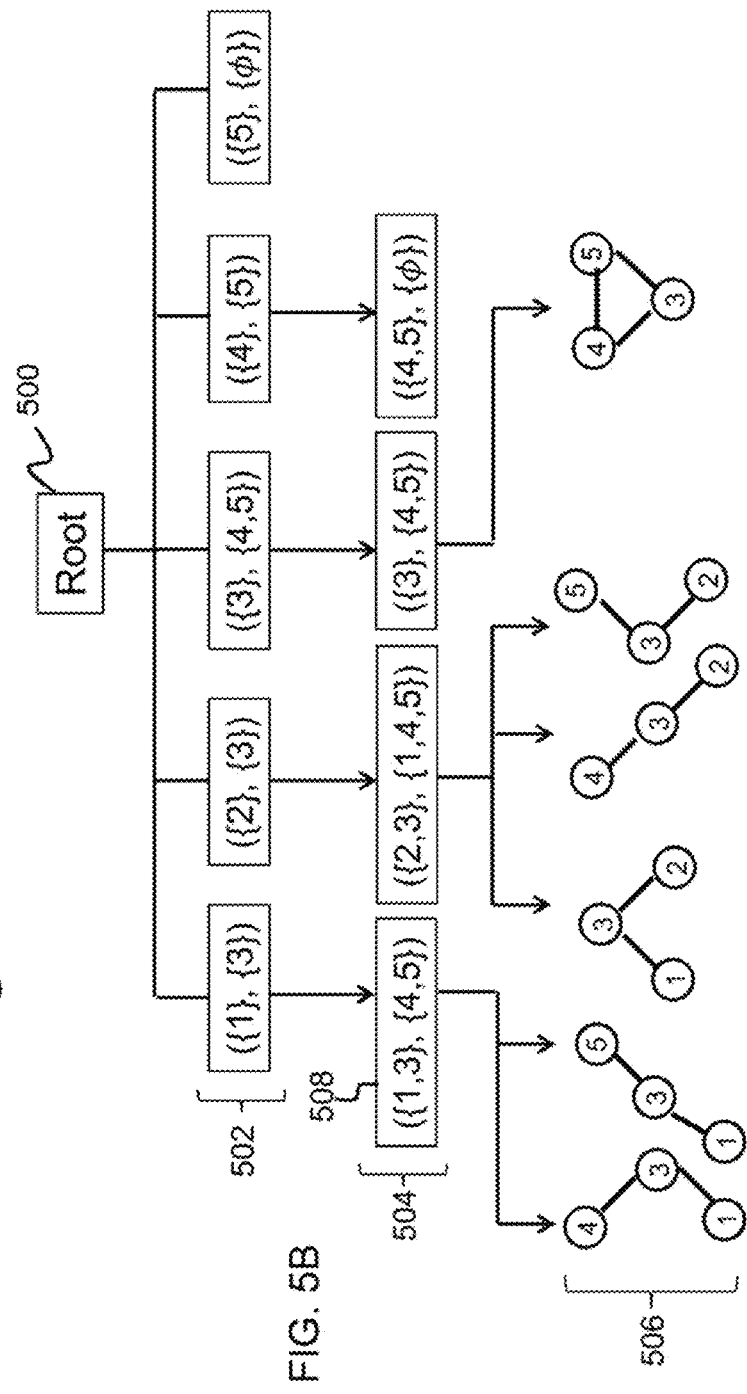
FIG. 5A is an illustration of a sample graph according to various embodiments of the present disclosure.
FIG. 5B is an illustration of finding all sub-graphs with the sample graph in FIG. 5A according to various embodiments of the present disclosure.

The success of analysis in the present invention relies on sufficient motif discovery algorithms. In this section, two broadly adopted algorithms that can be used are introduced as non-limiting examples of motif discovery algorithms, including the algorithm ESU (described in Literature Reference No. 6) and the algorithm G-Tries (described in Literature Reference No. 7). FIG. 5A depicts a sample graph, and FIG. 5B depicts the ESU (Enumerate Subgraph) algorithmic process of finding all sub-graphs with three nodes (where nodes are represented by numbered circles) in FIG. 5A.

The tree in FIG. 5B shows the enumerated subgraphs at the leaves (the very bottom row) for the graph in FIG. 5A of size k=3 (i.e. in each subgraph there are exactly 3 vertices). The depth of the tree starts at 0 for the root 500, and increments by 1 for each row below. Since the height of the tree defines the size of the subgraphs that it enumerates, the depth is also the same as the size (i.e. depth=k).

In the example depicted in FIG. 5B, the root 500 k=0, is the next row of boxes (element 502) ([({1}, {3})]. . . ) are k=1, the next row of boxes (element 504) are K=2, and the leaves (the bottom row of graphs (element 506)) are k=3. Note that there are exactly 3 vertices in each graph of each leaf (i.e., subgraphs of size k=3, are present at depth k=3 of the tree).

The term SUB is the name for the left-most set shown in each box, and the term EXT is the name for the right-most set in each box. Thus, for example, for the left-most box 508 in the row for k=2, would be labeled:
SUB={1,3}
EXT={4,5}.

The term SUB represents the current subgraph for the box. The term EXT represents the possible set of nodes that can be used to extend the subgraph. Thus, for the example above,
SUB=(1)-(3) is the subgraph, and
EXT=(4) and (5) are the nodes that can be used to extend this subgraph, as follows:
(1)-(3)-(4) is the extension of SUB=(1)-(3) with EXT=(4)
(1)-(3)-(5) is the extension of SUB=(1)-(3) with EXT=(5)

The algorithm ESU first finds the set of all induced sub-graphs of size k; let $S_k$ be this set. ESU can be implemented as a recursive function. The running of this function can be displayed as a tree-like structure of depth k, called the ESU-Tree, as depicted in FIG. 5B. Each of the ESU-Tree nodes (represented by boxes) indicate the status of the recursive function that entails two consecutive sets, SUB and EXT. SUB refers to nodes in the target network that are adjacent and establish a partial sub-graph of size |SUB|≤k. If |SUB|=k, the algorithm has found an induced complete sub-graph, so Sk=SUB∪Sk. However, if |SUB|<k, the algorithm must expand SUB to achieve cardinality k. This is done by the EXT set that contains all the nodes that satisfy two conditions.

First, each of the nodes in EXT must be adjacent to at least one of the nodes in SUB; second, their numerical labels must be larger than the labels of SUB nodes. The first condition makes sure that the expansion of SUB nodes yields a connected graph and the second condition causes ESU-Tree leaves (the bottom row of graphs (element 506)) to be distinct. As a result, overcounting is prevented. Note that, the EXT set is not a static set, so in each step it may expand by some new nodes that do not breach the two conditions.

The next step of ESU involves classification of sub-graphs placed in the ESU-Tree leafs into non-isomorphic size-k graph classes. Consequently, ESU determines sub-graphs frequencies and concentrations. This stage has been implemented simply by employing McKay's nauty algorithm (see Literature Reference No. 8 for a description of this algorithm), which classifies each sub-graph by performing a graph isomorphism test. Therefore, ESU finds the set of all induced k-size sub-graphs in a target graph by a recursive algorithm and then determines their frequency using an efficient tool.

The algorithm G-Tries is another motif discovery algorithm that may be utilized. G-Tries constructs a multiway tree (referred to as a g-trie) that can store a collection of graphs. Each tree node contains information about a single graph vertex and its corresponding edges to ancestor nodes. A path from the root to a leaf corresponds to one single graph. Descendants of a g-trie node share a common sub-graph. After constructing a g-trie, the counting part takes place. This is conceptually akin to a prefix tree, which stores sub-graphs according to their structures and finds occurrences of each of these sub-graphs in a larger graph. The main idea in the counting process is to backtrack by all possible sub-graphs, but at the same time do the isomorphism tests. The process takes advantage of common sub-structures in the sense that at a given time there is a partial isomorphic match for several different candidate sub-graphs.

G-Tries does not need to find those sub-graphs that are not in the main network, which can be one of the time-consuming parts in algorithms in which all sub-graphs in networks are derived. However, the tradeoff is the excessive use of memory, which might limit the size of discoverable motifs by a personal computer with average memory.

(3.2.3) Implementation and Time Complexity

To integrate the motif discovery algorithm with the attack detection package (i.e., the detection portion of the Xnet tool described in U.S. patent application Ser. No. 14/625,988) according to embodiments of the present disclosure, an open source package gtrieScanner (described in Literature Reference No. 7), that has implemented both ESU and G-Tries algorithms, was used. The G-Tries algorithm requires lower central processing unit (CPU) time. Yet, the two algorithms have similar computational complexity and, therefore, one embodiment of the detection package is based on the simpler ESU algorithm (see FIG. 6 for a table containing its pseudocode implemented by gtrieScanner).

The practical usefulness of the approach described herein strongly relies on the scalability of motif discovery algorithms, such as ESU and G-Tries algorithms. The time complexity of the algorithm depends mainly on two parameters, graph size N, and sub-graph size n. It is well known that all motif discovery algorithms scale superpolynomially with the sub-graph size n. Therefore, the motif size cannot be increased to very large values. However, the approach according to embodiments of the present disclosure works very well analyzing sub-graph sizes n<9, which is tractable. While the computational complexity in terms of the graph size N is theoretically unknown, judging from numerical results from previous work, it might be concluded that it scales as O(N*M) (with a fixed motif size n), where N is the number of nodes and M is the total numbers of motifs of the underlying network. For most communication networks explored, the graph is sparse and M linearly scales with N, leading to an overall time complexity $O(N^2)$ in terms of the whole network size (i.e., the number of devices).

(3.3) Attack Detection and Attribution with Motif Analysis

FIGS. 7A and 7B plot the frequency of motifs of each size during a reset (web) (FIG. 7A) and flooding (TTCP) (FIG 7B) attack. The "reset" attack sends a special type of TCP packet that essentially forces a TCP connection to "reset", or close unnecessarily. The "flooding" attack creates a large volume of unnecessary network traffic that causes a "denial-of-service" of the network. The distinct curve colors represent distinct motif sizes, as indicated in FIGS. 7A and 7B. Motif frequency measures the number of motifs occurring in a unit time. In a reset (web) attack, smaller motifs increase in frequency. In a flood attack (FIG. 7B), it is motifs greater than size 5 that predominate. In general, attacks (represented by peaks) are characterized by an over-representation of larger motifs (size>5). The threshold for detection of an attack is set by learning the maximum frequency of motifs of each size in normal baseline operation of the network. If the frequency of any motif size surpasses double the maximum frequency seen in baseline conditions, an attack condition is detected.

Figure 8:
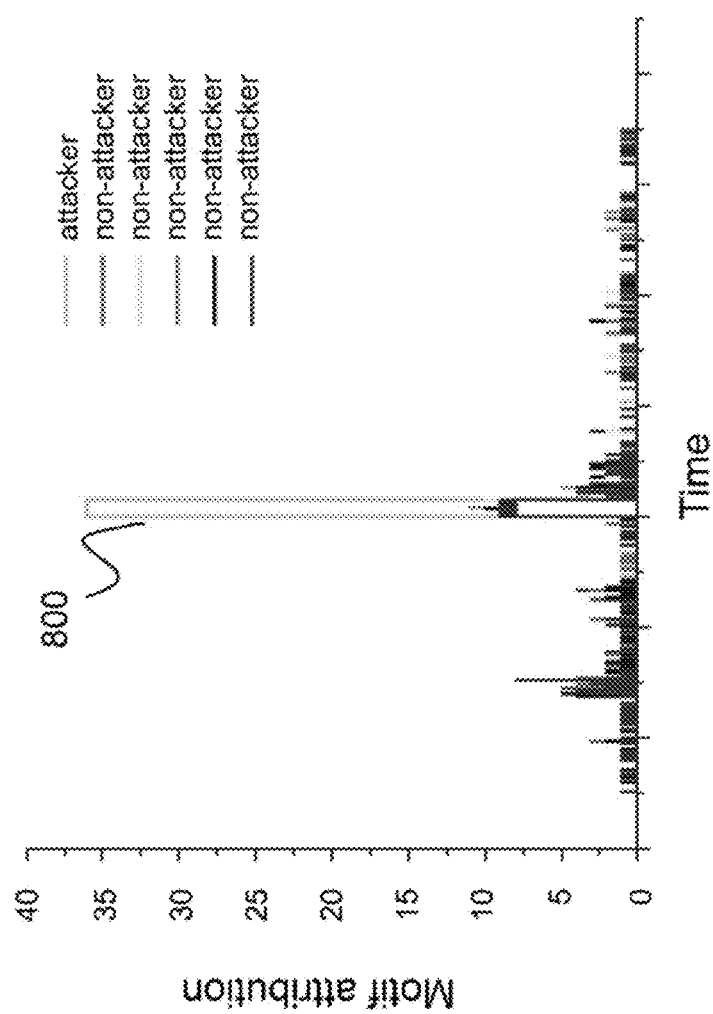
FIG. 8 is a plot illustrating attribution in a 6 node example using motifs of size 3 according to various embodiments of the present disclosure.

To locate the actual attacker within the network (called "attribution"), a motif attribution measure at each node is further introduced. For each node i, $m_i$ is defined as the frequency of sub-graphs it contributes to. Again, a large $m_i$ (greater than double the maximum seen in baseline conditions) indicates a high likelihood that node i is an attacker. FIG. 8 plots the motif attribution $m_i$ at the TTCP layer in a 6 node example using motifs of size 3 for five non-attackers and one attacking node that performed a blackhole attack after 500 milliseconds (ms). A "blackhole" attack has the ultimate goals of 1) forcing all routes to go through the attacking physical node (i.e., the node "captures" all of the routes between all other pairs of nodes in the network), and 2) dropping all of the subsequent data traffic that comes across those routes. Thus, this is similar in concept to how the extreme gravity of a blackhole pulls all matter into it and (seemingly) destroys it. Distinct curve colors represent the 5 non-attacking nodes and the one attacking node 800. The plot shows a clear signal (i.e., spike) only for the attacking node 800 when the attack happens. Here the attacking node 800 clearly stands out because the frequency of motifs of size 3 at that node increases nearly 4 times as much as any other node.

Figure 9:
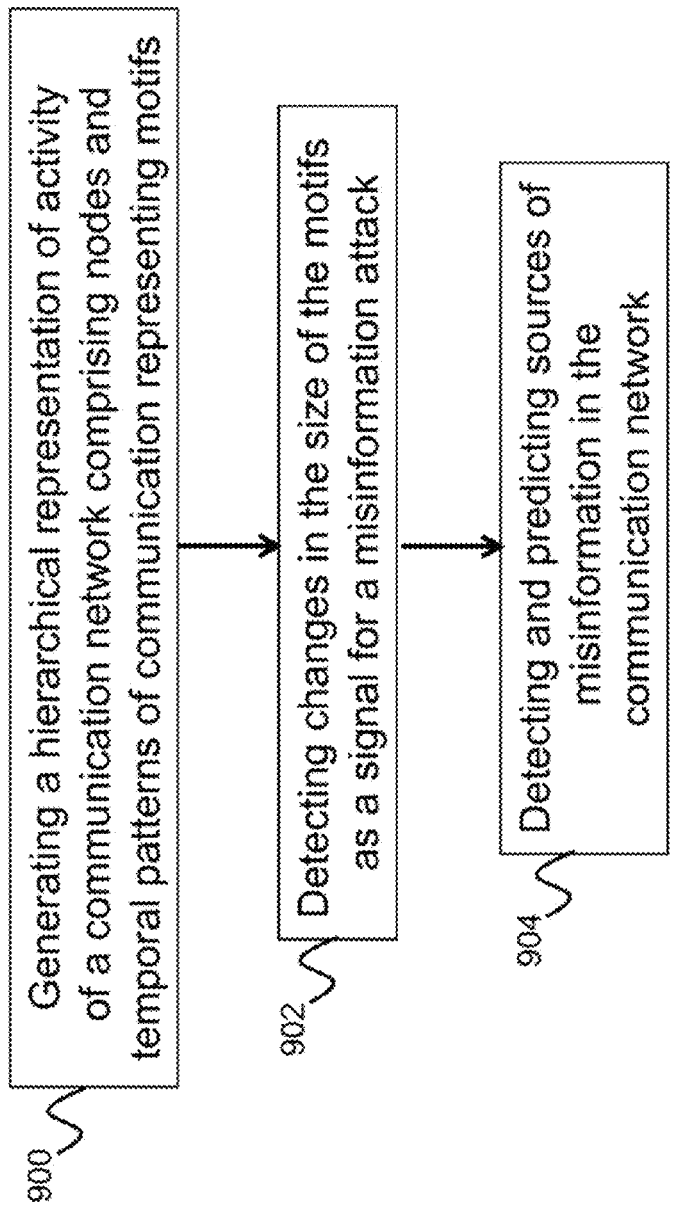
FIG. 9 is a flow diagram illustrating a method to detect attacks on mobile wireless networks according to various embodiments of the present disclosure.

FIG. 9 is a flow diagram of the method to detect attack on networks according to some embodiments of the present disclosure. As described above, in a first step 900, a hierarchical representation of network activity is generated. In a second step 902, changes in the size of temporal motifs in the hierarchical representation are detected. In a third step 904, sources of misinformation in the communication network are detected and predicted.

Mobile wireless networks experience widespread use in applications, non-limiting examples of which include mobile military and law enforcement networks (soldier-to-soldier, sensor-to-sensor, ground and aerial vehicle-to-vehicle); commercial vehicle-to-vehicle and vehicle-to-infrastructure networks; commercial mesh networks; wireless infrastructure ISPs, and cellular companies (extended data capacity). The invention described herein will significantly improve the security of these and other related networks, which currently rely predominantly on packet-level encryption to reduce the probability of external intrusion but do not detect or prevent "network insider" attacks.

In an embodiment, after identifying the presence of misinformation in the network, the system performs an operation to attribute who is responsible for the attack. After attributing the attack to an entity, the system can take actions to mitigate the attack. A non-limiting example of a mitigation action would be to isolate the attacking node (i.e., physical radio). For example, the action can include informing every other node in the network to simply ignore anything that the attacking node transmits, and not to send anything to, or through, the attacking node.

Implementation of the system described herein takes the form of a set of algorithms that provides rapid and accurate detection and prediction of sources of misinformation in the control plane of a wireless network. The algorithms/modules are protocol agnostic characteristics of the tool that will enable its transition into a wide variety of network security systems, including both wireless and wired networks. Furthermore, the inherent scalability of the approach makes it well-suited to operate effortlessly in much larger networks.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting attacks on networks, the system comprising:
   one or more processors and a non-transitory memory having instructions encoded thereon such that when the instructions are executed, the one or more processors perform operations of:
   detecting and predicting sources of misinformation in a communication network using a hierarchical representation of activity of the communication network;
   wherein the hierarchical representation comprises a plurality of nodes and temporal patterns of communication between at least one pair of nodes, each temporal pattern representing a motif, having a size, in the hierarchical representation, and wherein changes in motifs provide a signal for a misinformation attack.

2. The system as set forth in claim 1, wherein the one or more processors further perform an operation of generating a visual representation on a display relating to motifs of interest to identify a misinformation attack.

3. The system as set forth in claim 2, wherein a misinformation attack is characterized by an over-representation of motifs having a predetermined size.

4. The system as set forth in claim 3, wherein a size threshold for detection of a misinformation attack is set by learning a maximum frequency of motifs of each size in a normal baseline operation of the communication network.

5. The system as set forth in claim 4, wherein if a frequency of any motif size surpasses double the maximum frequency, a misinformation attack signal is detected.

6. The system as set forth in claim 5, wherein the one more processors further perform operations of:

introducing a motif attribution measure at each node i of the communication network; and for each node i, defining $m_i$ as a frequency of sub-graphs to which it contributes;

wherein a $m_i$ greater than double the maximum frequency indicates a likelihood that node i is an attacker.

7. The system as set forth in claim 1, wherein the hierarchical representation comprises a plurality of data tables that describe applications and services running on the communication network and a set of inter-dependencies between the applications and services.

8. A computer-implemented method for detecting attacks on networks, comprising:

an act of causing one or more processors to execute instructions stored on a non-transitory memory such that upon execution, the one or more processors perform operations of:

detecting and predicting sources of misinformation in a communication network using a hierarchical representation of activity of the communication network;

wherein the hierarchical representation comprises a plurality of nodes and temporal patterns of communication between at least one pair of nodes, each temporal pattern representing a motif, having a size, in the hierarchical representation, and wherein changes in motifs provide a signal for a misinformation attack.

9. The method as set forth in claim 8, wherein the one or more processors further perform an operation of generating a visual representation on a display relating to motifs of interest to identify a misinformation attack.

10. The method as set forth in claim 9, wherein a misinformation attack is characterized by an over-representation of motifs having a predetermined size.

11. The method as set forth in claim 10, wherein a size threshold for detection of a misinformation attack is set by learning a maximum frequency of motifs of each size in a normal baseline operation of the communication network.

12. The method as set forth in claim 11, wherein if a frequency of any motif size surpasses double the maximum frequency, a misinformation attack signal is detected.

13. The method as set forth in claim 12, wherein the one or more processors further perform operations of:

introducing a motif attribution measure at each node i of the communication network; and for each node i, defining $m_i$ as a frequency of sub-graphs to which it contributes;

wherein a $m_i$ greater than double the maximum frequency indicates a likelihood that node i is an attacker.

14. The method as set forth in claim 8, wherein the hierarchical representation comprises a plurality of data tables that describe applications and services running on the communication network and a set of inter-dependencies between the applications and services.

15. A computer program product for detecting attacks on networks, the computer program product comprising:

computer-readable instructions stored on a non-transitory computer-readable medium that are executable by a computer having one or more processors for causing the processor to perform operations of:

detecting and predicting sources of misinformation in a communication network using a hierarchical representation of activity of the communication network;

wherein the hierarchical representation comprises a plurality of nodes and temporal patterns of communication between at least one pair of nodes, each temporal pattern representing a motif, having a size, in the hierarchical representation, and wherein changes in motifs provide a signal for a misinformation attack.

16. The computer program product as set forth in claim 15, further comprising instructions for causing the one or more processors to perform an operation of generating a visual representation on a display relating to motifs of interest to identify a misinformation attack.

17. The computer program product as set forth in claim 16, wherein a misinformation attack is characterized by an over-representation of motifs having a predetermined size.

18. The computer program product as set forth in claim 17, wherein a size threshold for detection of a misinformation attack is set by learning a maximum frequency of motifs of each size in a normal baseline operation of the communication network.

19. The computer program product as set forth in claim 18, wherein if a frequency of any motif size surpasses double the maximum frequency, a misinformation attack signal is detected.

20. The computer program product as set forth in claim 19, further comprising instructions for causing the one or more processors to perform operations of:

introducing a motif attribution measure at each node i of the communication network; and for each node i, defining $m_i$ as a frequency of sub-graphs to which it contributes;

wherein a $m_i$ greater than double the maximum frequency indicates a likelihood that node i is an attacker.

21. The computer program product as set forth in claim 15, wherein the hierarchical representation comprises a plurality of data tables that describe applications and services running on the communication network and a set of inter-dependencies between the applications and services.

22. The system as set forth in claim 1, wherein upon detection of an attack of misinformation on the communication network, the one or more processors further perform an operation of performing a mitigation action.

23. The system as set forth in claim 22, wherein the mitigation action comprises isolating an attacking node from the rest of the communication network.

* * * * *